(12) United States Patent
Watanabe

(10) Patent No.: US 6,430,354 B1
(45) Date of Patent: Aug. 6, 2002

(54) METHODS OF RECORDING/REPRODUCING MOVING IMAGE DATA AND THE DEVICES USING THE METHODS

(75) Inventor: Kenji Watanabe, Ebina (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 09/212,309

(22) Filed: Dec. 16, 1998

(30) Foreign Application Priority Data

Dec. 16, 1997 (JP) .............................................. 9-346250

(51) Int. Cl.[7] ................................................ H04N 5/91
(52) U.S. Cl. .................... 386/46; 386/124; 375/240.12; 709/247
(58) Field of Search ...................... 386/124, 68, 81–82, 386/111–112, 109, 125–126, 46; 709/247; 375/240.12, 240.01, 240.15; H04N 5/91

(56) References Cited

U.S. PATENT DOCUMENTS 5,253,056 A * 10/1993 Puri et al. ............... 375/240.01
5,253,058 A * 10/1993 Gharavi ................. 375/240.12
5,381,526 A * 1/1995 Ellson ........................... 707/1
5,621,660 A * 4/1997 Chaddha et al. ............ 709/247
5,727,036 A * 3/1998 Maertens .................... 375/369

FOREIGN PATENT DOCUMENTS

JP          5227515          9/1993
JP          9098430          4/1997

* cited by examiner

Primary Examiner—Vincent Boccio
(74) Attorney, Agent, or Firm—Antonelli, Terry, Stout & Kraus, LLP

(57) ABSTRACT

A method, apparatus and computer program for recording and reproducing moving image data at any one of a plurality of different resolution levels or a lowest resolution level to reduce reproduction time. In the invention when recording, moving image data is coded in accordance with each of the resolution levels, and a result of the coding is output to a desired media in time series. The result includes coded data corresponding to each of the resolution levels. In the invention when reproducing, one of the resolution levels at which moving image data is to be reproduced is selected, coded data corresponding to the selected resolution level is input, and the coded data corresponding to the selected resolution level is decoded to reproduce the moving image data.

21 Claims, 8 Drawing Sheets

DATA STORAGE FORMAT IN THIS SYSTEM (DISPLAY ORDER)

FIG. 1  DATA STORAGE FORMAT IN THIS SYSTEM (DISPLAY ORDER)

SIZE OF ONE PIXEL IN EACH CODING LEVEL

IN CASE OF CODING
LEVEL A: SIZE OF
ONE PIXEL
(16 × 16 PIXELS)

IN CASE OF CODING
LEVEL B: SIZE OF
ONE PIXEL
(4 × 4 PIXELS)

IN CASE OF CODING
LEVEL C: SIZE OF
ONE PIXEL
(1 × 1 PIXELS)

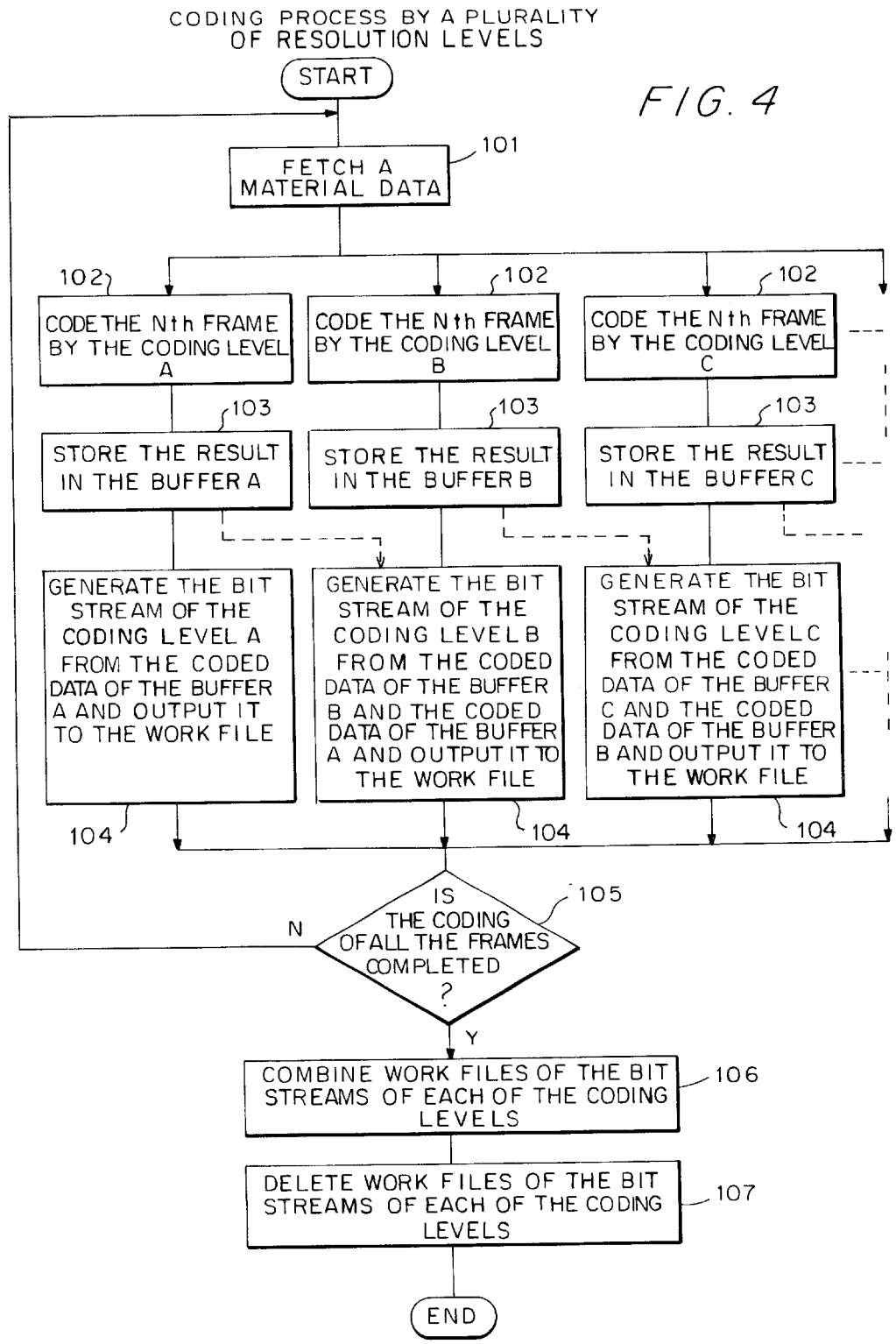

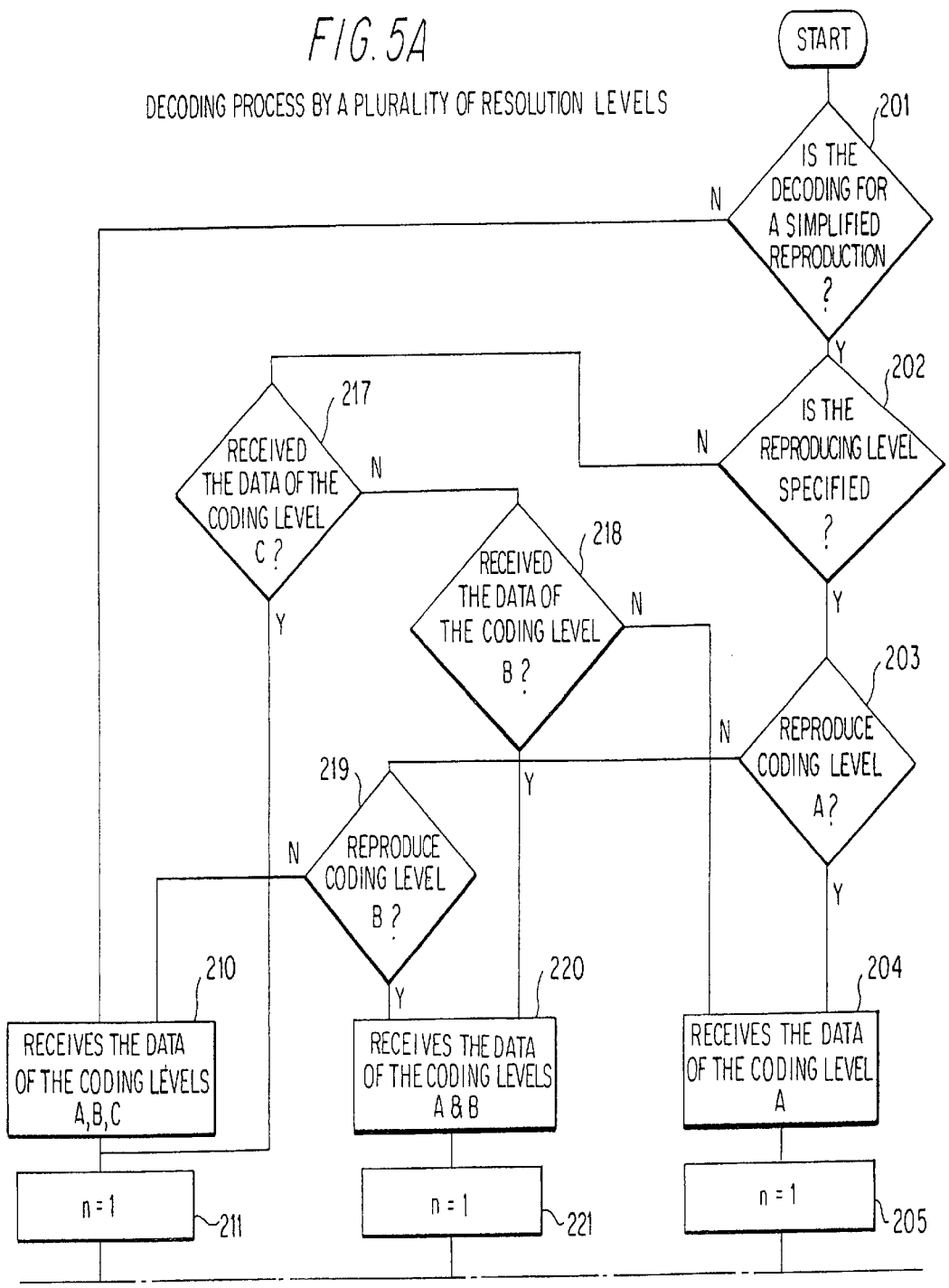

FIG. 8

| I | B | B | P | B | B | P | --- | B | B | P |
|---|---|---|---|---|---|---|---|---|---|---|
| 1st FRAME | 2nd FRAME | 3rd FRAME | 4th FRAME | 5th FRAME | 6th FRAME | 7th FRAME | | 898th FRAME | 899th FRAME | 900th FRAME |

DATA ARRAY OF MPEG SYSTEM (DISPLAY ORDER)

METHODS OF RECORDING/REPRODUCING MOVING IMAGE DATA AND THE DEVICES USING THE METHODS

BACKGROUND OF THE INVENTION

The present invention relates to a method, apparatus and computer program for recording/reproducing moving image data. More particularly, the present invention relates to a method, apparatus and computer program for use in transferring the moving image data through a communication media, storing the moving image data in a storage media, and reading the moving image data.

As a result of technological advancements and widespread use of information networks and information processing devices, the amount of moving image data being transferred through the information networks has been increasing. Since a moving image carries a huge mount of data compared with a still image, generally the moving image data is compressed by a coding system before being transferred. A typical coding system is, for example, Moving Pictures Expect Group (MPEG) coding system as illustrated in FIG. 8.

A coding system for reproducing a still image, is, for example, a progressive reproduction system. When the still image reproduced by this system is displayed through a browser of the Internet, the image first appears on a display screen as an unclear image having low definition. Thereafter, the definition of the image gradually increases until a clear image of a specific definition appears.

When moving image data on a storage media is received through a communication media such as the Internet and is reproduced, the data can only be reproduced up to the stage in which the data has been downloaded. This is so even if MPEG or other coding systems are used. Thus, when moving image data is received or reproduced through a low capacity communication media, viewing the moving image from the start until the end takes a long time since a huge amount of data must be first received then reproduced. Therefore, receiving moving image data in low capacity communication media can be inconvenient.

For example, if a user receives a moving image data for trial purposes, the user is required to view the content of the moving image data from the start until the end, and then judge its usefulness. In order to do this, the user must receive and store the huge amount of data corresponding to the moving image. This huge amount of data must be stored in the storage media of the user's apparatus regardless of whether all of the data is useful or not. Accordingly, there is an increase in communication costs and a loss of useable capacity of the storage media in the user's apparatus.

Further, if the user attempts to conduct a direct reproduction from the storage media with a low performance personal computer, making use of software, the user must reproduce each of the moving data from start until the end and view each moving image data. This process takes an exceptionally long period of time.

A conventional technique for handling moving image data is disclosed, for example, in the Japanese Published Unexamined Patent Application No. Hei 9-98430. The following is a brief description of technique wherein the conventional moving image data of a bitmap format is coded by the MPEG coding system and the result is stored in the storage media. This technique sets as an index information identifying particular packets each including an I-picture according to the MPEG coding system an I-picture is inter-frame coded data independent from preceding and succeeding the frame. Further, the technique selectively reads and reproduces each packet including an I-picture during a special mode reproduction such as high-speed reproduction. The technique intends to reduce the burden placed on a decoder. Although the technique is able to reduce the amount of data to be read out during the special mode reproduction, it is not able to perform the reproduction under normal reproduction speed.

Another conventional technique is disclosed, for example, in Japanese Published Unexamined Patent Application No. Hei 5-227515. This conventional technique makes use of hierarchical coding and monolayer coding in accordance with resolutions of the encoder on the transmitting side and the decoder on the receiving side. This technique is intended to achieve an improvement in the coding rate. However, on the receiving side this technique also needs to receive all of the moving image data in order to view the moving image from the start until the end.

SUMMARY OF THE INVENTION

The invention provides that on the transmitting side, moving image data is encoded in accordance with a plurality of resolution levels different from each other, and output to communication media in time series by each coded data of each resolution level. On the receiving side the moving image data is reproduced by selecting coded data of an arbitrary resolution level to decode, and reproducing the selected coded data at the arbitrary resolution level from the start until the end.

The invention is able to reproduce the moving image data within an arbitrary range from the start until the end, with less data compared with the conventional technique, and is able to display the moving image data more clearly in accordance with the increase of received data. Thus, the present invention is able to reproduce the moving image progressively. The invention makes use of not only the inter-resolution compression, but also the inter-frame compression to make the stored data even less.

BRIEF DESCRIPTION OF THE DRAWINGS

The scope of the present invention will be apparent from the following detailed description, when taken in conjunction with the accompanying drawings, and such detailed description and specific examples, while indicating exemplary embodiments of the invention, are given by way of illustration only, since various changes and modifications within the spirit and scope of the invention will become apparent to those skilled in the art from this detailed description, in which:

FIG. 4 is a flowchart illustrating the coding process of the of the present invention;

FIG. 8 is a conceptual diagram illustrating an example of the conventional MPEG format for moving image data.

DETAILED DESCRIPTION OF THE INVENTION

First, an exemplary embodiment of the method, apparatus and computer program for recording and reproducing moving image data will be described with reference to FIGS. 1–5.

In the present invention, moving image data can be provided, for example, as data having a length of 30 seconds, wherein the data is formed into frames having a frequency of 30 frames per second and each frame has a screen size of 352×240 pixels. Conventionally, the MPEG coding system compresses the data of each frame, as illustrated in FIG. 8, and stores them from 1st through 900th frames by means of the inter-frame compression.

Figure 1:
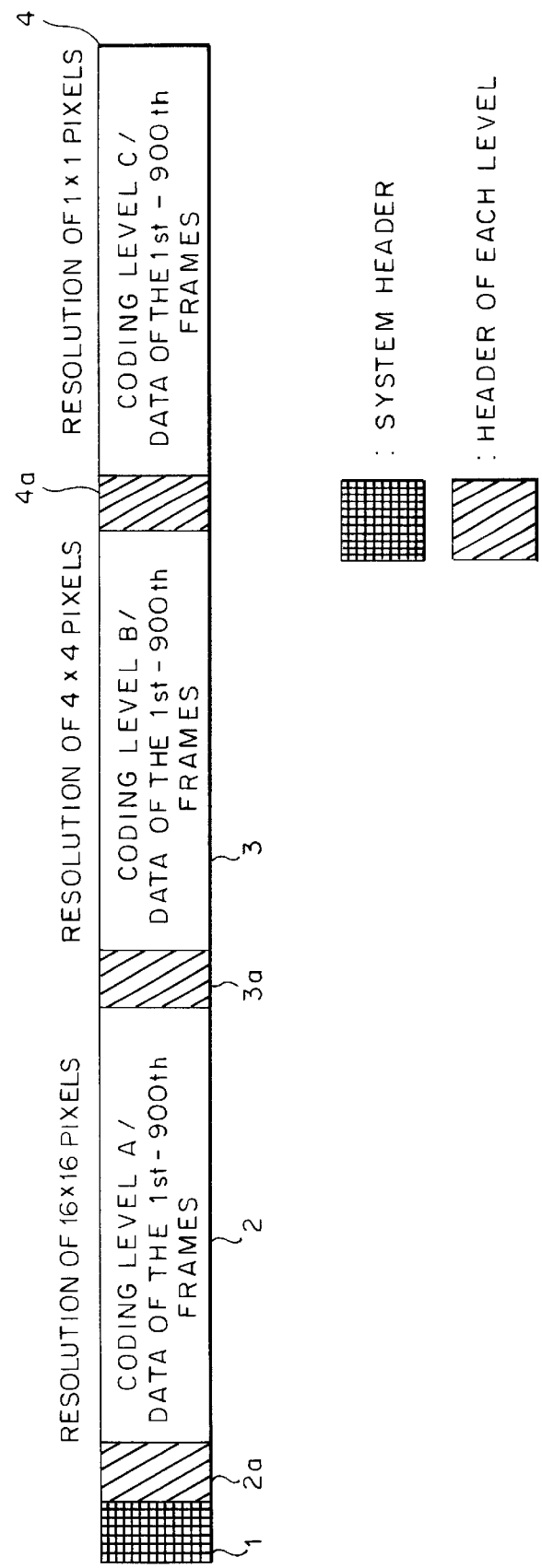
FIG. 1 is a conceptual diagram illustrating an example of a data format used in the present invention.
Figure 2:
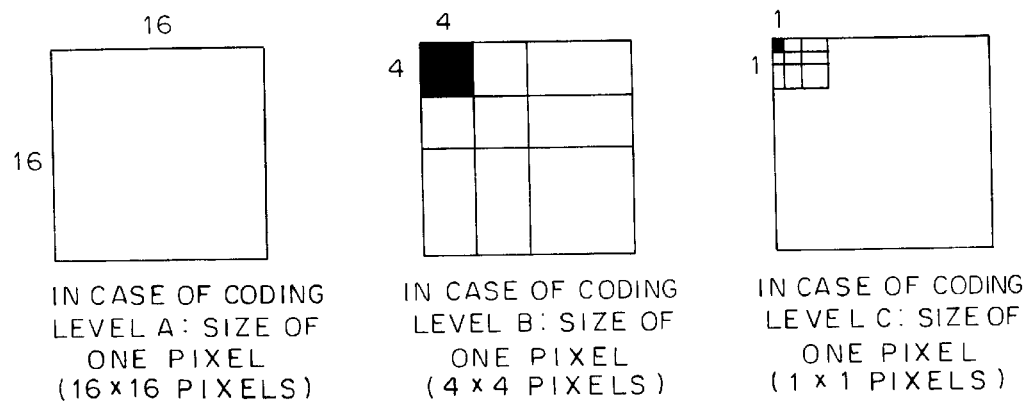
FIG. 2 is a conceptual diagram illustrating an example of the size of one pixel in each coding level according to the present invention.

By use of the method, apparatus and computer program of the present invention described below a bit stream of moving image data (coded data) having a plurality of sub-bit streams corresponding to a plurality of resolution levels is generated as illustrated in FIG. 1. The plural resolution levels allows for the progressive reproduction of moving image. As illustrated in FIG. 1, these three levels of resolutions could, for example be 16×16 pixels, 4×4 pixels (coding level B), and 1×1 pixel (coding level C). In the present invention, for example, coding level A is the lowest resolution and coding level C is the highest resolution level. The present invention will be described using the three resolutions levels described above. However, any number of resolution levels can be used.

The bit stream of moving image data recorded and reproduced by the present invention has a format, for example, including a system header 1 at the top, a bit stream 2 of coding level A, a bit stream 3 of coding level B, and a bit stream 4 of coding level C in series. Further, a level header 2a, level header 3a, and level header 4a are added to each of the leading parts of the bit streams 2 to 4 of coding levels A to C.

In the system header 1 are stored information concerning the moving data, for example, the size of the total stream and the stream type to indicate whether the data is video data or audio data. When the data is a video stream information of resolution level, bit rate, picture rate, aspect ratio, etc. are provided. When the data is an audio stream information of sampling frequency, bit rate, mode (stereo/monaural), etc., is provided. Further, in the individual headers 2a to 4a are written unique data to clearly demonstrate to the reproduction device that the coding level is changed at the respective level headers.

Since the audio signal contains less data per unit time compared with the video signal, the audio data can be mixed into the first bit stream 2 of the coding level A. In the coding level A, the coding is performed under the resolution of 16×16 pixels per unit. In the coding level B, the coding is performed under the resolution of 4×4 pixels per unit. Coding of data for coding level B may require, for example, differential data (relating to brightness, chrominance, etc.) from the preceding coded data of coding level A. In the coding level C, the coding is performed under the resolution of 1×1 pixel per unit. The coding of data for coding level C may require, for example, differential data (relating to brightness, chrominance, etc.) from the preceding coded data of the coding level B.

According to the present invention, inter-resolution compression can be carried out between the data of the coding levels of the plural different resolutions. For example, the data size of each of the bit streams 2 to 4 of the coding levels A to C is 1.6×60=96 M bits=12 M bytes, when the file size extends for 60 seconds, the system bit rate is 1.6 Mbps, and the size of the screen is 352×240 pixels. If coding is performed using the resolution of 16×16 pixels per unit in the coding level A, the number of pixels to be processed is $16^{-2}=1/256$ compared with the case when the resolution of 1×1 pixel per unit is used. Thus, the data size is about 47 Kbytes when the file size extends for 60 seconds. If coding is performed using the resolution of 4×4 pixels per unit in the coding level B, the number of pixels to be processed is $4^{-2}=1/16$ compared with the case when the resolution of 1×1 pixel per unit is used. Thus, the data size is about 750 Kbytes when the file size extends for 60 seconds. The difference between the coding level B and the coding level A is approximately 750−47=703 Kbytes. If coding is performed using the resolution of 1×1 pixels per unit in the coding level C, the data size is 12 Mbytes. The difference between the coding level C and the coding level B is approximately 12 Mbytes−703 Kbytes=11.3 Mbytes.

The image data of a rectangular screen having an arbitrary size (height H=width W) can be coded by setting the coding level. The coding level can be set to any of the three levels, 16×16 (coding level A), 4×4 (coding level B), 1×1 (coding level C), arbitrarily in accordance with the resolution of moving image data as a material.

Figure 3:
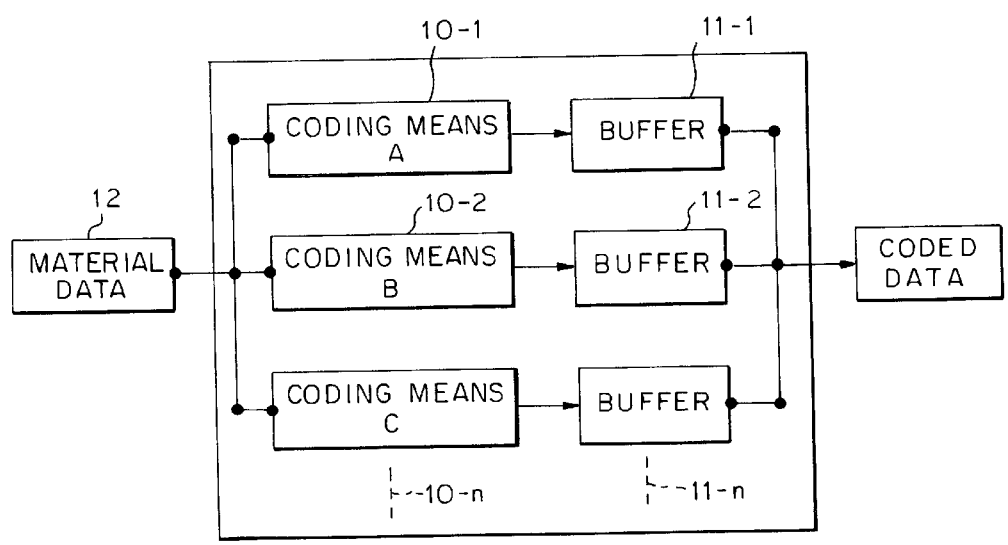
FIG. 3 is a diagram illustrating the coding of moving image data at plural coding levels according to the present invention.

The overall construction of an exemplary coding apparatus included in a server of the present invention in which the coding of a plurality of resolution levels is performed is illustrated in FIG. 3. The steps performed by the server through use of the coding apparatus shown in FIG. 3 is illustrated by the flowchart in FIG. 4. The steps of the flowchart illustrated in FIG. 4 can, for example, correspond to one or more instructions of a computer program. The computer program can, for example, be in the computer programming language C++. Further, the computer program can, for example, be stored on a storage medium, such as a CD ROM, floppy disk, storage device, etc., and can be distributed by a network connected to server and client apparatus. In the server the computer program can be provided as part of a total operating system including a computer program that can be provided to client apparatus as needed. The computer program can be executed by the server or by a Personal Computer (PC) that uploads results of execution to the server.

The coding apparatus includes plural coding means 10-1 to 10-n (n: natural number more than 2), each of which executes a coding according to different resolutions of n-levels, and buffers 11-1 to 11-n correspondingly connected to the plural coding means 10-1 to 10-n. Each coding means 10-n and its respective buffer 11-n is connected in series in a line and each line is connected in parallel with other lines each have connected in series coding means 10-n and its respective buffer 11-n.

According to the flowchart in FIG. 4, material data 12 for a frame is input to each line (step 101). The coding according to each resolution level of each line for the frame is executed in parallel (step 102) in coding means 10-n. The result is stored in the corresponding buffer 11-n (step 103). For each resolution level, except the lowest resolution level, data of a lower resolution level stored in a lower resolution level buffer 11-n is obtained to provide differential data to the coding for a higher resolution level. Further, for each resolution level, except the lowest resolution level, a bit stream is generated based on the differential data and the coded data stored in buffer 11-n of the resolution level of concern (step 104). If all of the frames have not been coded, steps 101–105 are repeated (step 105). If all of the frames have been coded, the coded data are read out from the work file in a particular order, for example, from the lower resolution level toward the higher resolution level forming a bit stream having plural sub-bit streams. The header information described above is added to the bit stream, and the bit stream is output to an arbitrary media (step 106). Thereafter, the work file is deleted (step 107). The bit stream being output has a plurality of sub-bit streams 2–4 in the format as described above and illustrated in FIG. 1.

Figure 5B:
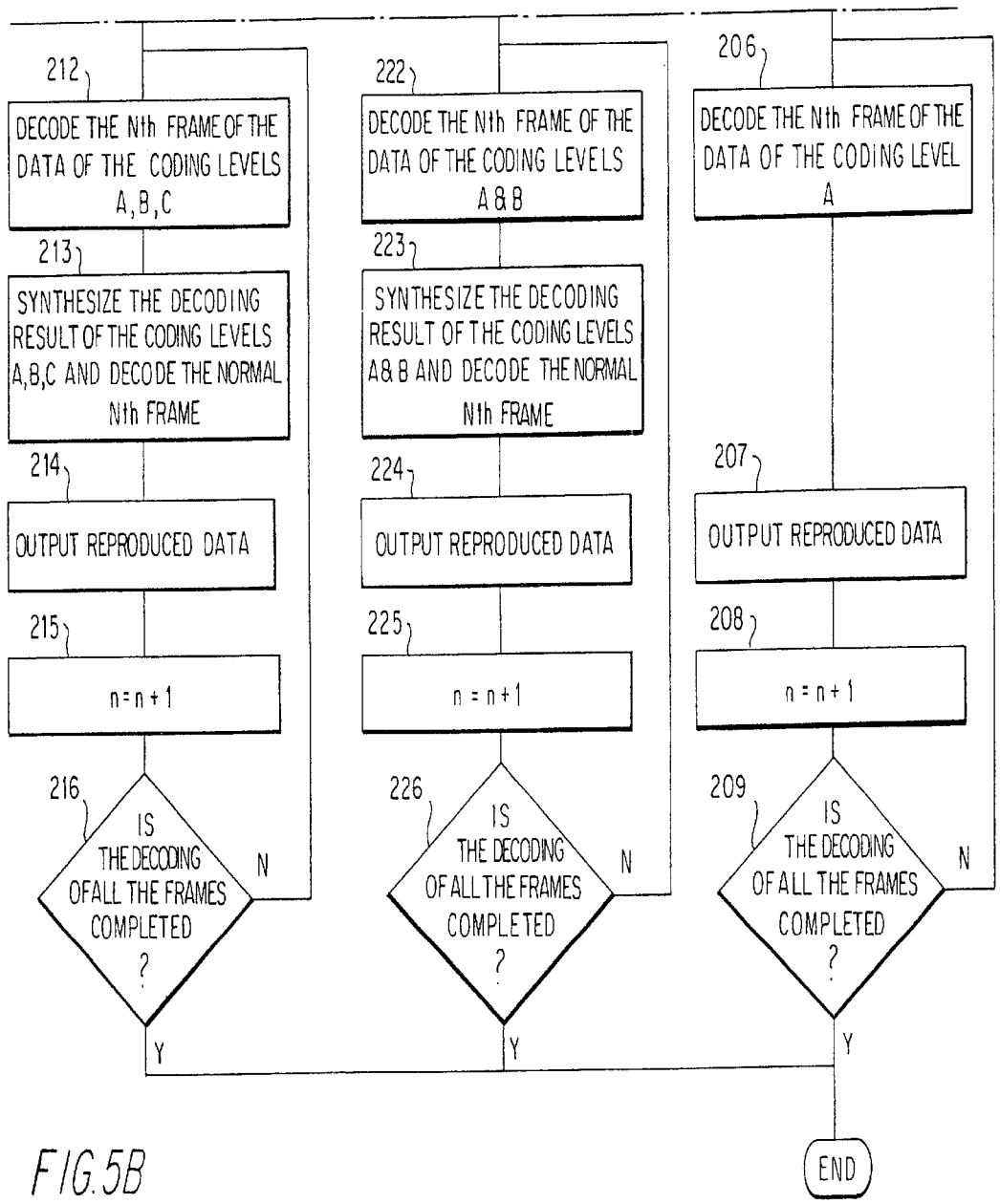
FIGS. 5A and B combined form a flowchart illustrating the decoding process of the present invention.

When the bit stream having the format as described above and illustrated in FIG. 1 is received in client apparatus, the steps performed by the client to reproduce the moving image data are illustrated in the flowchart in FIGS. 5A and B. The client reproduces the moving image data in various modes by the plural resolution levels. The steps of the flowchart illustrated in FIGS. 5A and 5B can, for example, correspond to one or more instructions of a computer program. The computer program can, for example, be in the computer programming language C++. Further, the computer program can, for example, be stored on a storage medium such as a CD ROM, floppy disk, storage device, etc., and can be distributed by a network connected to server and client apparatus. In the client apparatus the computer program can be provided as part of a total operating system or as a plug-in program to an internet browser such as for example Internet Explorer (registered trademark of Microsoft Corporation) or Netscape Navigator (registered trademark of Netscape Corporation). The client apparatus can, for example, be a PC or a stand alone reproduction device which plays movies, music videos, etc. The computer program to be executed by the client apparatus can, for example, be transmitted to the client apparatus by the server apparatus via the network when moving image data is requested by the client apparatus.

The bit streams 2–4, including the coded data A–C having different resolution levels, are input to the client apparatus in a particular order, for example, from a lower resolution level toward higher resolution levels. Thus, the data being input extends from less data toward more data. When the bit stream 2 of the coding level A (16×16 pixels) is processed for reproduction, an image having rough and vague definition (lower resolution level) as a whole is reproduced. Moving image data of coding level A can be reproduced easily and swiftly in a shorter period of time after receiving the data due to the low amount of data (coding level A produces data of 1/256 the data of coding level C).

Thus, even when the capability of the communication media and the client (reproduction device) is low, or the environment on the receiving side requires a long time to receive/reproduce a great quantity of moving image data because of an increase of the load the communication media, etc., the moving image data can still be reproduced in a shorter period of time from the start until the end of such data. When the bit streams 3 to 4 of a coding level B (4×4 pixels) and a coding C (1×1 pixels) are processed for reproduction, images having higher definition (high resolution level) as a whole are reproduced. Moving image data of coding levels B and C may take longer to reproduce, however, since they are accompanied with an increase of reception data quantity.

As per the flowchart illustrated in FIGS. 5A and B, when the moving image data of the format illustrated in FIG. 1 is received, a determination is made as to whether decoding is for simplified reproduction with less data (step 201). Simplified reproduction can, for example, cause playback of moving image data at the lowest resolution level from the server. Whereas playback other than simplified reproduction can, for example, cause playback of moving image data at a higher resolution level from the storage (hard disk) of the client apparatus.

If the decoding is for simplified reproduction, a determination is made as to whether the reproducing level is specified (step 202). If the reproducing level is specified a determination is made whether to reproduce coding level A (step 203). Steps 202 and 203 are tests to determine whether a particular resolution level has been specified and if specified is the level specified coding level A. Coding level A is the resolution level specified when simplified reproduction has been selected. If coding level A is specified, then the bit stream 2 of the coding level A having the least data, is completely received (step 204), and reproduction thereof is started. First a frame number n is initialized to 1 (step 205), and the operation of decoding the nth frame is performed (step 206). The reproduced data is output (step 207), and the frame number n is incremented (step 208). A determination is then made as to whether all of the frames have been decoded (step 209). If all of the frames have not been decoded, then steps 206–209 are repeated.

If the decoding is not for the simplified reproduction at step 201, then clear, full reproduction is conducted. The reproduction is started after all of the bit streams 2 to 4 of the coding levels A to C are received (step 210). The frame number n is initialized to 1 (step 211), and data of the nth frame is read out in parallel from each of the coded data of the coding levels A to C and decoded (step 212). The decoded results are synthesized (step 213), and reproduced data for a normal clear image is output (step 214). The frame number n is incremented (step 215), and a determination is made as to whether all of the frames have been decoded (step 216). If all of the frames have not been decoded, then steps 212–216 are repeated.

If the reproducing level is not specified at step 202, then a determination is made as to whether the received data is for coding level C (step 217). If the data of coding level C has been received, then steps 211–216 are performed. If the data of coding level C has not been received, then a determination is made as to whether the received data is of coding level B (step 218). If the data of coding level B has not been received, then steps 204–209 are performed. If the data of the coding level B has been received, then the data of coding levels A and B are received (step 220). Thereafter, the frame number n is initialized to 1 (step 221) and the operation of reading out in parallel from each of the coded data of the coding levels A and B and decoding such data is performed (step 222). The results of the decoding are synthesized (step 223) and reproduced data corresponding to the decoded results is output (step 224). The frame number n is incremented (step 225) and a determination is made whether data of all of the frames have been decoded (step 226). If the data of all of the frames have not been decoded, then steps 222–226 are repeated.

Thus, according to the invention as described above, steps 217 and 218 serve to determine the amount of data that has been received, when simplified reproduction has been selected, so as to cause the appropriate steps to be performed since some amount of the data may have already been received. Accordingly, if only data of the coding level A has been received, then steps 204–209 are performed. If data of the coding levels B and A have been received, then the steps 220–226 are performed. If data of coding levels A, B and C have been received, then the steps 211–216 are performed.

Steps 202 and 203, as described above, operate together along with a step 219 to perform the appropriate steps if a particular reproducing level is been specified. For example, if a reproducing level is specified then step 203 determines whether the reproducing level specified is coding level A. If coding level A has been specified, then steps 204–209 are performed. Step 219 determines whether the reproducing level specified is coding level B. If coding level B is specified then steps 220–226 are performed. If according to step 219 coding level B is not specified, then coding level C has been specified and steps 210–216 are performed.

In the present invention, it is possible to perform a reproduction by an intermediate resolution level between the resolution of the simplified reproduction image and the resolution of the full reproduction image.

Figure 6:
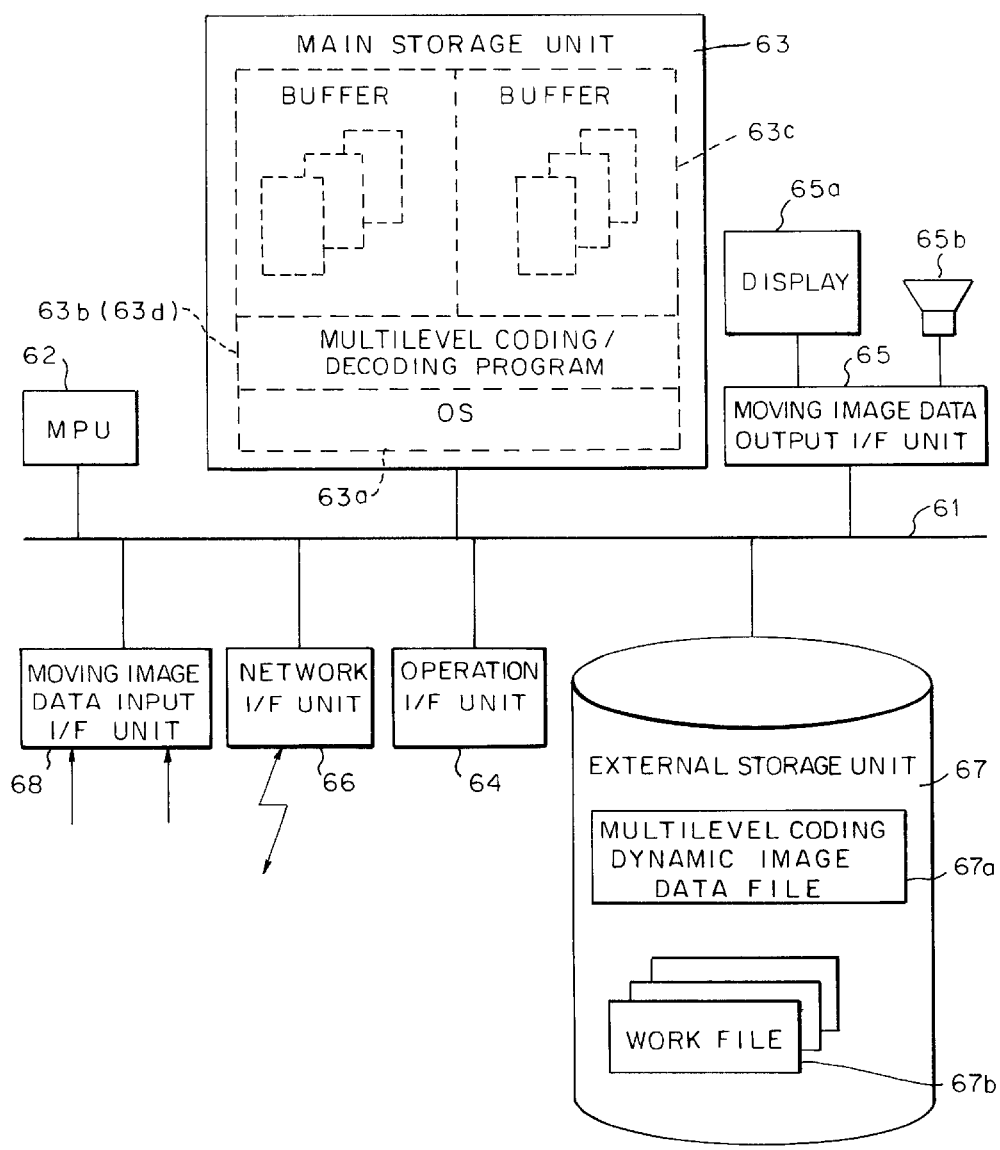
FIG. 6 is a diagram illustrating an example of a moving image recording and reproducing device according to the present invention.
Figure 7:
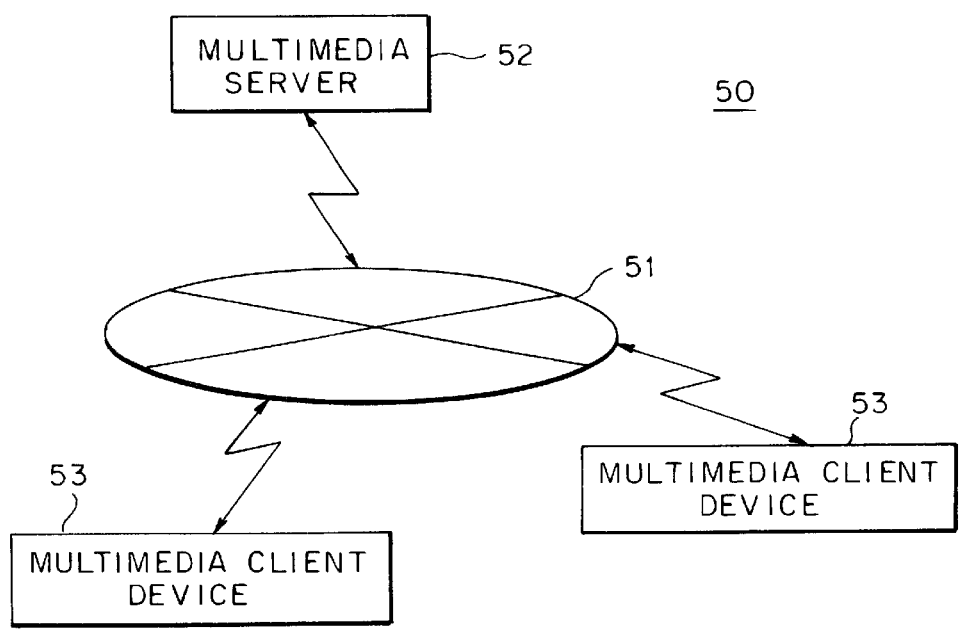
FIG. 7 is a diagram illustrating an example of a communication network including a plurality of moving image recording and reproducing devices according to the present invention.

The above described flowcharts illustrated in FIGS. 4 and 5A and B in which coding and decoding of moving image data according to a plurality of the resolution levels are shown, can be applied to an information processing network 50 as illustrated in FIG. 7 in which multimedia data are distributed. The information processing network 50 illustrated in FIG. 7 includes, for example, communication media 51 such as the Internet, Intranet, LANs, etc., a multimedia server 52 which distributes moving image data through the communication media 51, and a plurality of multimedia client devices 53 that utilize the distributed data. The structure of each of the multimedia server 52 and each multimedia client device 53 is illustrated in FIG. 6.

As illustrated in FIG. 6, the multimedia server 52 includes a system bus 61, a microprocessor 62, a main storage unit 63 that stores various programs and data such as an operating system 63a, which, when executed, controls operation of the microprocessor 62 and the various connected units described later, a multilevel coding program 63b, which performs the coding process according to a plurality of resolution levels as illustrated in FIG. 4, and a buffer 63c for use as work area. The multilevel coding program 63b can, for example, include instructions corresponding to the steps of the flowchart illustrated in FIG. 4. The multimedia server 52 also includes an operation interface (I/F) unit 64, a moving image data output I/F unit 65, which is connected to a display 65a for outputting multimedia data such as graphic images and sounds, and a speaker 65b, etc., a network I/F unit 66 for connecting the server to the communication media 51, an external storage unit 67 that stores desired data and other data as needed in a multilevel coding moving image data file 67a and a work file 67b, and a moving image data input I/F unit 68 to which a video source equipment such as an analog video recording/reproducing device, a camera, analog moving image data reproduction device, etc., are connected to input an moving image data as material data.

The multimedia client device 53 is constructed the same as, for example, the multimedia server 52 described above and illustrated in FIG. 7 except that the moving image data input I/F unit 68 is not included. In addition, the main storage unit 63 stores, instead of the multilevel coding program 63b, a decoding program 63d for decoding/reproducing the multilevel coded data generated by the multilevel coding program 63b, as illustrated in the flowchart of FIGS. 5A and B. The decoding program 63d can, for example, include instructions corresponding to the steps of the flowchart illustrated in FIGS. 5A and B.

In the information processing network 50 the multimedia server 52 inputs moving image data as material data from a video source equipment through the moving image data input I/F unit 68. The multimedia server 52 causes the microprocessor 62 to run the multilevel coding program 63b using the resources such as the buffer 63c in the main storage unit 63 and the work file 67b in the external storage unit 67, to execute instructions corresponding to the steps of the flowchart illustrated in FIG. 4. Execution of the multilevel coding program generates a bit stream of the format illustrated in FIG. 1. The bit stream is stored in the multilevel coding moving image data file 67a.

The multilevel coding moving image data file 67a may be a database including plural bit streams of the format illustrated in FIG. 1 that are generated in correspondence with each of plural kinds of moving image data. When the multimedia client device 53 requests to download a desired moving image data, the multimedia server 52 reads out the corresponding bit stream data from the multilevel coding moving image data file 67a, and sends the data to the multimedia client device 53 through the network I/F unit 66 and the communication media 51.

The multimedia client device 53 on the receiving side is able to execute the simplified reproduction of the moving image data from the start until the end in a shorter period of time after receipt of the data of bit stream 2 as illustrated in FIG. 1. The data of bit stream 2 is less than that data of the other bit streams 3 and 4 and it comes at the beginning of the bit stream having the format illustrated in FIG. 1. Thus, steps 204–209 of the flowchart illustrated in FIGS. 5A and B are performed. Therefore, even when the communication media 51 has a narrow band and/or the multimedia client device 53 has a comparably low processing capacity, a swift and simplified reproduction of moving image data can be conducted. In the multimedia client device 53 using the conventional technique all of the moving image data must be received before the moving image data can be reproduced. Thus, a longer period of time is necessary for moving data can be reproduced in the conventional apparatus. However, in the present invention for example, only a slight quantity of the bit stream 2 of the format illustrated in FIG. 1 is required before the moving image data can be reproduced. Thus, it possible in the present invention to judge whether the moving image data is desired or not to receive a great quantity of moving image data. Therefore, it is possible to significantly reduce the quantity of moving image data flowing through the communication media 51, and the quantity of moving image data temporarily stored in the external storage unit 67 on the side of the multimedia client device 53. Thus, it is possible to reduce the communication cost, and to utilize the external storage unit 67 more efficiently.

When using a nonvolatile semiconductor memory, for example, which is more costly than a normal rotary storage media, as the external storage unit 67 on the side of the multimedia client device 53, the storage capacity of the external storage unit 67 can be utilized efficiently effectively.

While the present invention has been described in detail and pictorially in the accompanying drawings, it is not limited to such details since many changes and modification recognizable to these of ordinary skill in the art having the benefit of this invention may be made to the invention without departing from the spirit and scope of the invention, and all such modifications as would be obvious to one skilled in the art and/or which become possible as technology develops, are intended to be included within the scope of the following claims.

I claim:

1. A method of recording moving image data, comprising:
coding the moving image data in accordance with a plurality of resolution levels different from each other; and outputting a result of said coding step to a desired media in time series, wherein the result includes coded data corresponding to each of the resolution levels, wherein differential data between coded data of adjoining resolution levels is calculated by subtracting coded data of a higher resolution level from coded data of a lower resolution level in sequence, and the differential data is output in time series to a desired media.

2. A method according to claim 1, wherein the coded data of each resolution level includes audio data synchronized with the moving image data.

3. A method according to claim 1, wherein the coded data of each resolution level includes audio data synchronized with the moving image data.

4. A method of reproducing moving image data which is coded in accordance with a plurality of resolution levels different from each other and stored on a desired media, comprising:

selecting one of the resolution levels at which moving image data is to be reproduced;

inputting coded data corresponding to the selected resolution level;

decoding the coded data corresponding to the selected resolution level to reproduce moving image data; and reproducing the coded data corresponding to the selected resolution level at the time input of the coded data is started, wherein prior to selecting a resolution level, coded data corresponding to each of the resolution levels are read out from the desired media in time series such that a lowest resolution level is read out first and a highest resolution level is read out last, and wherein when a simplified reproduction is selected, the lowest resolution level is selected and data corresponding to the lowest resolution level is input.

5. A method according to claim 4, further comprising:
reproducing the coded data corresponding to the selected resolution level at the time input of the coded data is started.

6. A moving image data recording device, comprising:
data input means for inputting moving image data;
coded data generation means for generating coded data corresponding to a plurality of resolution levels different from each other based on the moving image data; and a media to which the coded data corresponding to the resolution levels are output as a bit stream, wherein said coded data generation means outputs differential data which is calculated by subtracting coded data of a higher resolution level from coded data of a lower resolution level in sequence.

7. A moving image data reproducing device, comprising:
an input media which inputs coded data generated based on moving image data, said coded data corresponding to a plurality of resolution levels different from each other; and reproduction means for selecting a resolution level at which moving image data is to be reproduced, and decoding coded data corresponding to the selected resolution level to reproduce moving image data, wherein said reproduction means reproduces the coded data corresponding to the selected resolution level at the time input of the coded data is started, wherein said input media inputs coded data corresponding to each of the resolution levels in time series such that a lowest resolution level is read out first and a highest resolution level is read out last, and wherein said reproduction means, in response to selection of a simplified reproduction, selects the lowest resolution level and inputs data corresponding to the lowest resolution level.

8. A moving image data reproducing device according to claim 7, wherein said reproduction means reproduces the coded data corresponding to the selected resolution level at the time input of the coded data is started.

9. A computer program stored on a storage medium for recording moving image data, said computer program when executed causes a computer to perform the steps of:

coding the moving image data in accordance with a plurality of resolution levels different from each other; and outputting a result of said coding step to a desired media in time series, wherein the result includes coded data corresponding to each of the resolution levels, wherein differential data between coded data of adjoining resolution levels is calculated by subtracting coded data of a higher resolution level from coded data of a lower resolution level in sequence, and the differential data is output in time series to a desired media.

10. A computer program according to claim 9, wherein the coded data of each resolution level includes audio data synchronized with the moving image data.

11. A computer program according to claim 9, wherein the coded data of each resolution level includes audio data synchronized with the moving image data.

12. A computer program stored on a storage medium for reproducing moving image data which is coded in accordance with a plurality of resolution levels different from each other and stored on a desired media, said computer program when executed causes a computer to perform the steps of:

selecting one of the resolution levels at which moving image data is to be reproduced;

inputting coded data corresponding to the selected resolution level;

decoding the coded data corresponding to the selected resolution level to reproduce moving image data; and reproducing the coded data corresponding to the selected resolution level at the time input of the coded data is started, wherein prior to selecting a resolution level, coded data corresponding to each of the resolution levels are read out from the desired media in time series such that a lowest resolution level is read out first and a highest resolution level is read out last, and wherein when a simplified reproduction is selected, the lowest resolution level is selected and data corresponding to the lowest resolution level is input.

13. A computer program according to claim 12, wherein said computer program when executed further causes said computer to perform the steps of:

reproducing the coded data corresponding to the selected resolution level at the time input of the coded data is started.

14. A data structure for causing a moving image data reproducing device to reproduce moving image data at any one of a plurality of different resolution levels, comprising:

a system header which includes information concerning the moving image data; and a plurality of coded data corresponding to the resolution levels said coded data being arranged in series so that coded data corresponding to a lowest resolution level is first after said system header and coded data corresponding to successively higher resolution levels successively follow said coded data corresponding to the lowest resolution level, wherein a header precedes each coded data of a respective resolution level.

15. A data structure according to claim 14, wherein when simplified reproduction is conducted in the moving image data reproducing device, moving image data is reproduced using coded data corresponding to the lowest resolution level.

16. A storage medium having stored thereon a data structure for causing a moving image data reproducing device to reproduce moving image data at any one of a plurality of different resolution levels, comprising:

a system header which includes information concerning the moving image data; and a plurality of coded data corresponding to the resolution levels, said coded data being arranged in series so that coded data corresponding to the lowest resolution level is first after said system header and coded data corresponding to successively higher resolution levels successively followed said coded data corresponding to the lowest resolution level, wherein a header precedes each coded data of a respective resolution.

17. A storage medium according to claim 16, wherein when simplified reproduction is conducted in the moving image data reproducing device, moving image data is reproduced using coded data corresponding to the lowest resolution level.

18. A system comprising:

a moving image data recording device which includes:

data input means for inputting moving image data, and coded data generation means for generating coded data corresponding to a plurality of resolution levels different from each other based on the moving image data;

a media to which the coded corresponding to the resolution levels are output from said coded data generation means as a bit stream; and a moving image data reproducing device which includes:

reproduction means for selecting a resolution level at which moving image data is to be reproduced, inputting coded data from said media corresponding to the selected resolution level and decoding the coded data corresponding to the selected resolution level to reproduce moving image data, wherein said coded data generation means outputs differential data which is calculated by subtracting coded data of a higher resolution level from coded data of a lower resolution level in sequence.

19. A system according to claim 18, wherein the media inputs to the moving image data reproducing device coded data corresponding to each of the resolution levels in time series such that a lowest resolution level is read out first and a highest resolution is read out last, and wherein said reproduction means, in response to selection of a simplified reproduction, selects the lowest resolution level and inputs data corresponding to the lowest resolution level.

20. A system according to claim 18, wherein said reproduction means reproduces the coded data corresponding to the selected resolution level at the time input of the coded data is started.

21. A system according to claim 19, wherein said reproduction means reproduces the coded data corresponding to the selected resolution level at the time input of the coded data is started.

* * * * *